United States Patent
Niikawa (10) Patent No.: US 7,042,500 B1
(45) Date of Patent: May 9, 2006

(54) IMAGE DISPLAY SYSTEM, IMAGE PROCESSING APPARATUS, AND METHOD FOR DISPLAYING IMAGE DATA

(75) Inventor: Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/291,071

(22) Filed: Apr. 14, 1999

(30) Foreign Application Priority Data

Apr. 17, 1998 (JP) ............................. 10-108003

(51) Int. Cl.
*H04N 5/232* (2006.01)
*H04N 5/225* (2006.01)

(52) U.S. Cl. .................... 348/211.4; 348/207.1; 348/333.02

(58) Field of Classification Search ............. 348/207.1, 348/207.11, 211.14, 14.03, 14.05, 211.8, 348/211.13
See application file for complete search history.

(56) References Cited

U.S. PATENT DOCUMENTS

| | | | | |
|---|---|---|---|---|
| 5,291,587 A | * | 3/1994 | Kodosky et al. ............... | 703/2 |
| 5,452,222 A | * | 9/1995 | Gray et al. ................... | 702/122 |
| 5,477,264 A | | 12/1995 | Sarbadhikari et al. | |
| 5,479,206 A | * | 12/1995 | Ueno et al. ............... | 348/211.5 |
| 5,675,358 A | * | 10/1997 | Bullock et al. .............. | 345/420 |
| 5,920,342 A | * | 7/1999 | Umeda et al. ......... | 348/211.14 |
| 5,943,050 A | * | 8/1999 | Bullock et al. .............. | 345/783 |
| 5,999,213 A | * | 12/1999 | Tsushima et al. ........... | 348/180 |
| 6,005,613 A | * | 12/1999 | Endsley et al. ........... | 348/231.6 |
| 6,346,962 B1 | * | 2/2002 | Goodridge ................ | 348/14.05 |
| 6,353,461 B1 | * | 3/2002 | Shore et al. ................. | 348/722 |
| 2002/0024607 A1 | * | 2/2002 | Suga et al. ............ | 348/333.05 |

* cited by examiner

Primary Examiner—Ngoc-Yen Vu
Assistant Examiner—James M. Hannett
(74) Attorney, Agent, or Firm—Buchanan Ingersoll PC (57) ABSTRACT

An image display system includes a photographing apparatus and an image processing apparatus connectable to the photographing apparatus. The photographing apparatus has a transmitter for transmitting prephotographed image data of an object before the object is actually photographed. The image processing apparatus has a receiver for receiving the prephotographed image data transmitted from the transmitter, and a display for displaying the received image data with the same number of pixels as the photographing apparatus.

3 Claims, 13 Drawing Sheets

IMAGE DISPLAY SYSTEM, IMAGE PROCESSING APPARATUS, AND METHOD FOR DISPLAYING IMAGE DATA

The present invention claims priority based on Japanese Patent Application Serial No. H10-108003, the content of which are incorporated hereinto by reference in its entirety.

BACKGROUND OF THE INVENTION

1. Field of the Invention

This invention relates to an image display system comprising a photographing apparatus, such as a digital camera, which takes still images of stationary objects as photoelectrically converted image signals, provides signal processing if necessary, and records the image signals in a recording medium, and a computer (for example, a personal computer, which may be simply referred to as a PC) to which the digital camera is connected. The present invention also relates to an image processing apparatus for providing image processing to image data, and a method for displaying image data.

2. Description of the Related Art

In general, image data photographed by a digital camera is taken into a computer by image take-in software (i.e., driver software), and then the image data is processed, printed, or recorded using an application software of the computer. Some driver software has functions for allowing live-view images of the digital camera to be displayed, or allow the user to actuate the shutter from the driver software side.

However, in the conventional digital camera systems, sufficient consideration is not made on the cooperative manipulation between the digital camera and the computer in spite of the fact that the digital camera and the computer are mutually related to contact each other. For instance, if an image is simultaneously displayed on both the display panel of the digital camera and the monitor screen of the computer, the image qualities or the image conditions differ. In addition, if the shutter operation is instructed on the monitor screen of the computer, the use cannot know immediately what kind of image is photographed. Such inconvenience is undesirable for the user.

SUMMARY OF THE INVENTION

Therefore, it is an object of the present invention to overcome these problems in the prior art, and to provide an image display system having an improved cooperativity between a photographing apparatus, such as a digital camera, and an image processing apparatus, such as a computer, when these two apparatuses are connected to each other.

It is another object of the present invention to provide an image processing apparatus which is connected to the photographing apparatus and constitutes an image display system.

It is still another object of the present invention to provide a method for displaying image data suitably used in the image display system.

It is yet another object of the present invention to provide a control method for the photographing apparatus.

It is still another object of the present invention for providing a program product executable by a computer.

In order to achieve these objects, in one aspect of the present invention, an image display system including a photographing apparatus and an image processing apparatus connectable to the photographing apparatus is provided. The photographing apparatus has a transmitter for transmitting prephotographing image data of an object to the image processing apparatus before the object is actually photographed. The image processing apparatus has a receiver for receiving the prephotographing image data transmitted from the transmitter, and a display for displaying the received prephotographing image data with the same number of pixels number as the photographing apparatus.

Because with this system the prephotographed image transmitted from the photographing apparatus is displayed on the display means of the image processing apparatus with the same number of pixels as the photographing apparatus, the user can confirm the image to be photographed in the actual size on the display of the image processing apparatus. If the user wants to manipulate the image to be photographed from the image processing apparatus side, the image resulting from the manipulation can be easily confirmed.

Preferably, the image processing apparatus further has a setter which is displayed on the display and allows the user to set correction parameters of the image data. Thus, the user can set the correction parameters to desirable values by manipulating the setter displayed on the image processing apparatus, and can immediately confirm the new image condition corrected through the setter. Such correction parameters are, for example, colour adjusting levels of red, green and blue, and a white balance adjusting level.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

Figure 1:
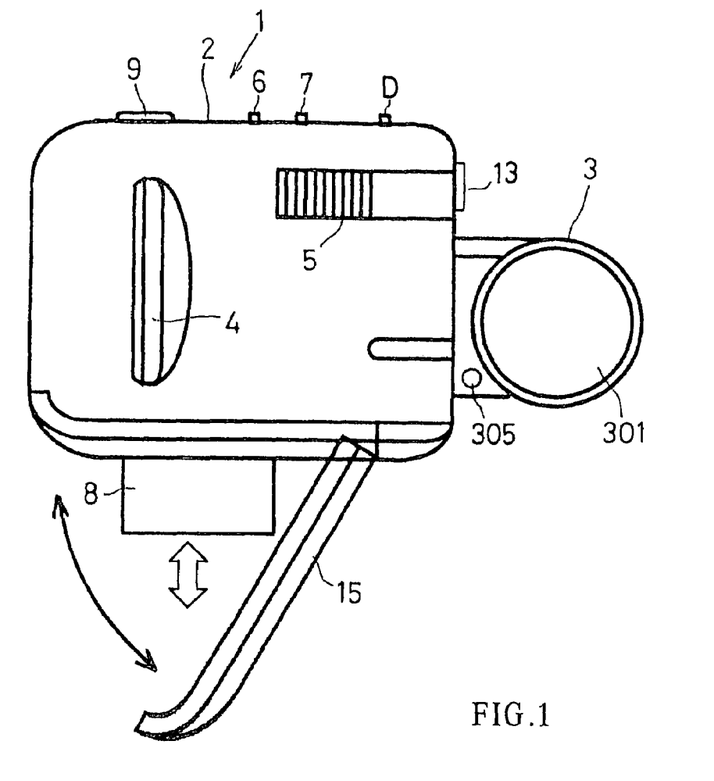
FIG. 1 is a front view of the digital camera used in the image display system according to an embodiment of the present invention.
Figure 2:
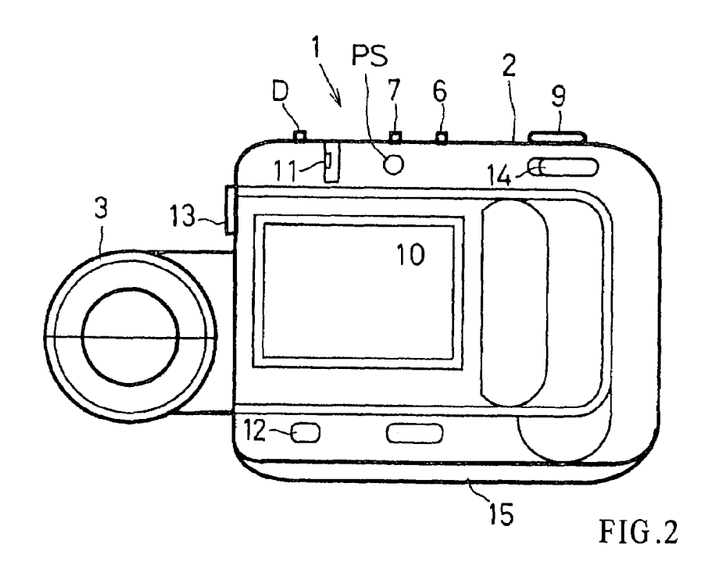
FIG. 2 is a rear view of the digital camera shown in FIG. 1.
Figure 3:
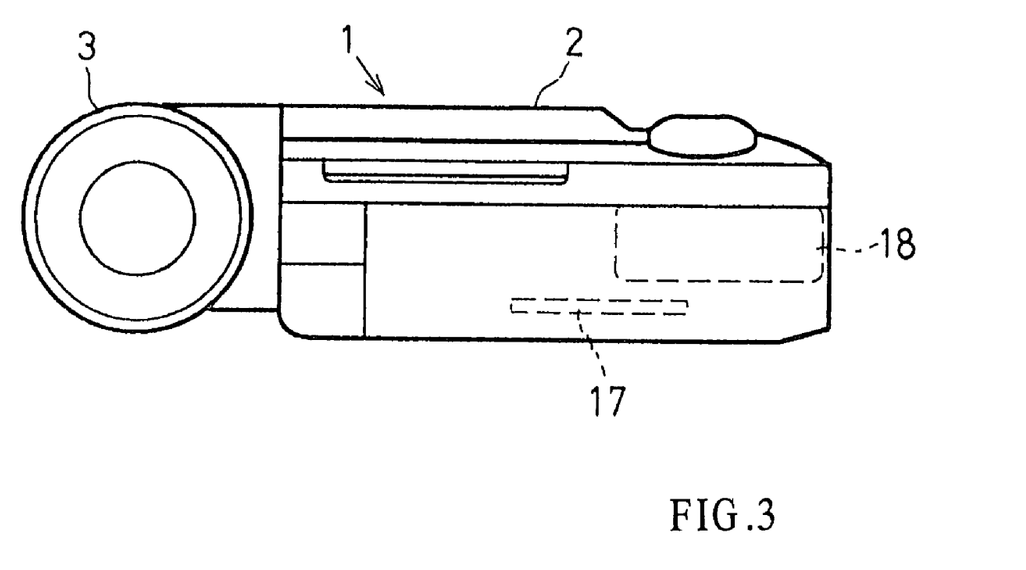
FIG. 3 is a bottom view of the digital camera shown in FIG. 1.

FIGS. 1–3 illustrate a digital camera as a photographing device for use in an image display system according to one example of the present invention.

As shown in FIGS. 1–3, a digital camera 1 comprises a camera frame, which is referred to as a main body 2, and a photographing unit 3 which is attachable to and removable from the main body 2 on the right side of the main body 2 in the front view shown in FIG. 1. The photographing unit 3 is pivotable within a plane parallel to the right side of the main body 2.

The photographing unit 3 has an image pick-up device comprising a zoom lens 301 and a photoelectric conversion device such as a CCD (Charge Coupled Device) array, to convert the optical image of an object into an electric image consisting of charge signals, each of which was generated by each pixel of the CCD via photoelectric conversion. The main body 2 has a display or LCD (Liquid Crystal Display) 10, a slot 17 for receiving a memory card 8, and a connection terminal 13 for connecting the digital camera to the outside apparatus. The image signal taken by the photographing unit 3 is subjected to a prescribed image processing in the main body 2. The processed image is displayed on the LCD display 10, recorded into the memory card 8, or transferred to the PC.

A zoom lens 301 is provided in the photographing unit 3. An image pick-up circuit including a CCD color area sensor 303 is located at an appropriated position behind the zoom lens 301. A light adjusting circuit 304 having a photo sensor 305 for receiving flash light reflected from the object is provided at an appropriated position in the photographing unit 3.

As shown in FIG. 1, a grip 4 is formed in the left-hand side of the front face of the camera main body 2, and a built-in flash device 5 is provided in the right-hand upper side at an appropriate position. Frame forward and backward switches 6 and 7 are provided near the center of the top face of the main body 2 as shown in FIG. 2. The forward switch 6 feeds the frame in the direction that the frame number increases in the photographed order, and is referred to as an UP key 6. The backward switch 7 feeds the frame in the direction that the frame number decreases, and is referred to as a DOWN key 7. A delete key D for deleting the images recorded in the memory card 8 is provided on the left of the DOWN key 7, and a shutter button 9 is provided on the right of the UP key 6 in the rear view shown in FIG. 2.

As shown in FIG. 2, an LCD 10 is provided in the middle of the left-hand side of the rear face of the camera main body 2. The LCD 10 functions as a view finder during photographing, and as a display during the reproduction of the recorded image. A compression rate setting slide switch 12 for switching the compression rate K of the image date to be recorded in the memory card 8 is positioned below the LCD 10. A USB (Universal Serial Bus) connection terminal 13 is positioned on the side face of the main body 2 near the photographing unit 3. A power switch PS is provided on the top of the rear face of the main body 2.

The flash device (which may be abbreviated as FL) of the digital camera 1 has an "automatic flash mode", a "forcible flash mode", and a "flash prohibition mode". In the "automatic flash mode", the built-in flash device 5 automatically emits flash light according to the luminance of the object. In the "forcible flash mode", the built-in flash device 5 forcibly emits flash light regardless of the luminance of the object. In the "flash prohibition mode", light emission of the built-in flash device 5 is prohibited. Every time the user presses the FL mode setting key 11 positioned above the LCD 10 on the rear face of the main body 2, the flash mode is switched among three modes in a cyclic order. The digital camera 1 has a 1/8 compression rate and a 1/20 compression rate, and the user can select the preferred compression rate K. For example, if the compression rate setting switch 12 is shifted to the right, the compression rate K is set to 1/8, and if it is shifted to the left, the compression rate K is set to 1/20. Although, in this embodiment, the compression rate K is set to two values, it may be set to three or more values.

A photographing/reproduction mode setting switch 14 is positioned at the top right of the rear face of the main body 2. Digital pictures are taken in the photographing mode. In the reproduction mode, the digital images recorded in the memory card 8 are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected. If a slide switch is employed as a switch which is frequently shifted for changing modes, the set mode is easily recognized, resulting in a user-friendly apparatus.

The FL mode setting switch 11, the UP key 6, the DOWN key 7, the delete key D and the shutter button 9 comprise a push key, respectively.

A card insertion slit 17 for receiving the memory card 8 and a battery cavity 18 are positioned on the bottom face of the main body 2. The slit 17 and the battery cavity 18 are covered with a clam-shell type cover 15. The digital camera 1 is loaded with a power supply source E consisting of four AA batteries connected in series.

Figure 4:
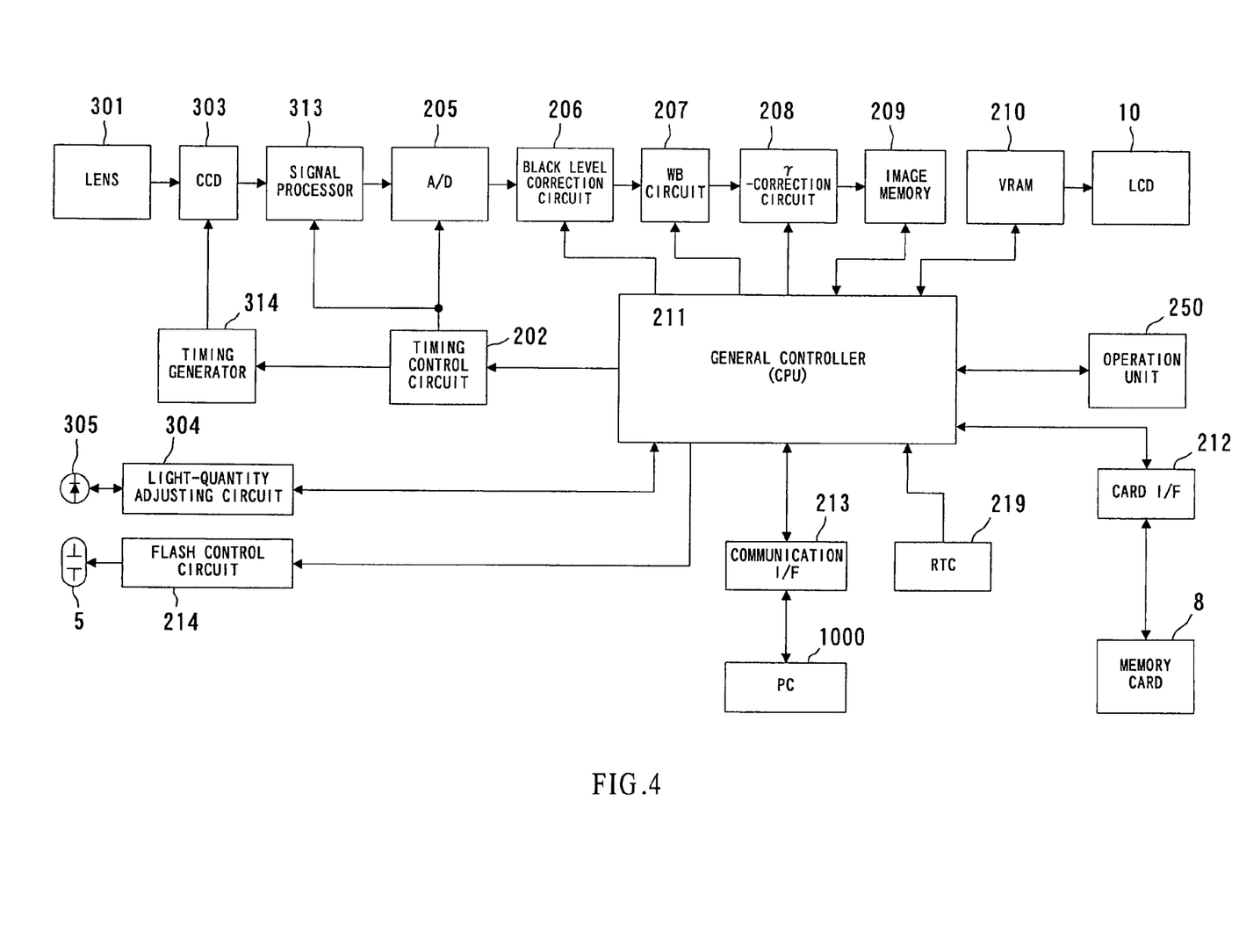
FIG. 4 is a block diagram of the control system of the digital camera show in FIGS. 1 through 3.

FIG. 4 is a block diagram of the control system of the digital camera 1.

The CCD 303 in the photographing unit 3 photoelectrically converts the optical image of the object focused by the zoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the photographing unit 3 is fixed, the exposure of the photographing unit 3 is controlled by adjusting the quantity of exposure of the CCD 303, that is, the charge accumulation time of the CCD 303, which correspond to the shutter speed. If the luminance of the object is too low to select to an appropriate shutter speed, the level of the image signal output from the CCD 303 is adjusted in order to compensate for the insufficient exposure. In other words, at a low luminance, the exposure is controlled by adjusting both the shutter speed and the gain. The level of the image signal is adjusted by controlling the gain of the AGC circuit in the signal processor 313.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These timing signals are supplied to the CCD 303.

The signal processor 313 applies prescribed analogue signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 controls the light emission of the built-in flash device 5 to a predetermined level determined by the general controller 211 when the flash device is used during the photographing. During the flash photographing, the flash light reflected from the object is received by the photo sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 stops the light emission of the built-in flash device 5, whereby the light emission amount of the built-in flash device 5 can be regulated to the prescribed level.

The A/D converter 205 provided in the main body 2 of the digital camera 1 converts each pixel signal (i.e., analog signal) of the image signal sequence into a 10-bit digital signal based on the A/D conversion clock supplied from the A/D clock generator (not shown).

A reference clock/timing generator 314 and a timing control circuit 202 are also provided in the main body 2. The timing control circuit 202 is controlled by the general controller 211, and generates a clock for the A/D converter 205.

A black level correction circuit 206 corrects the black level of the digitalized pixel signal (hereinafter referred to as pixel data) converted by the A/D converter 205 to the reference black level. A white balance circuit (hereinafter referred to as WB circuit) 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (or the slope of the characteristic line) for each color component in the level conversion table is set each photographed image by the general controller 211.

The γ correction circuit 208 corrects for the γ characteristic of the pixel data. The γ correction circuit 208 has, for example, six γ correction tables with different γ characteristics, and uses the most appropriate γ correction table according to the photographed scene or the photographic conditions.

An image memory 209 stores the pixel data output from the γ correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data which is to be reproduced and displayed on the LCD 10. The VRAM 210 has a memory capacity corresponding to the number of pixels to be photographed by the CCD 10 (640×480). Since the number of pixels which can be displayed on the LCD 10 is ⅜ of the number of pixels photographed by the CCD (i.e., 240×180 pixels), the LCD 10 displays by thinning out the photographed image data on the rate.

In the photographing preparation mode, each pixel data of the image taken by the photographing unit 3 every 1/30 seconds is subjected to the prescribed signal processing by the sequence from the A/D converter 205 to the γ correction circuit 208, and stored in the image memory 209. This pixel data is simultaneously transferred to the VRAM 210 via the general controller 211, and displayed on the LCD 10. The user can see the photographed object on the LCD 10. In the reproduction mode, the image read out from the memory card 8 is subjected to the prescribed signal processing by the general controller 211, which is then transferred to the VRAM 210, and displayed on the LCD 10.

A card I/F 212 is an interface for writing and reading image data into and from the memory card 8. A communication I/F 213 is an interface based on, for example, the USB standard, or an interface for wireless communication for externally connceting the PC 1000.

A flash control circuit 214 controls light emission of the built-in flash device 5. In particular, the flash control circuit 214 controls the quantity of flash light, flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown).

An operation unit 250 is an I/F for the general controller 211 and includes the UP key 6, the DOWN key 7, the shutter button 7, the FL mode setting key 11, the compression rate setting key 12, and the photographing/reproduction mode setting switch 14.

The general controller 211 is composed of a microcomputer, and it organically controls the driving timing of each element in the photographing unit 3 and the main body 2 so as to generally control the photographing operation of the digital camera 1.

If, in the photographing mode, the shutter button 9 is pressed to start photographing, the general controller 211 creates tag information (such as the frame number, exposure value, shutter speed, compression rate K, photographing date and time, flash ON/OFF data, scene information, image determination result, etc), store the tag information in the memory card 8, together with the thumbnail image created from the image taken in the image memory 209 after the start of the photographing operation, and the compressed image created by a JPEG method at a predetermined compression rate K.

The memory card 8 can store forty frames of images taken by the digital camera 1 at a compression rate of 1/20. Each of the frames has tag information, high-resolution image data (640×480 pixels) compressed by a JPEG method, and thumbnail image data (80×60 pixels). Each frame may be treated as an image file of, for example, an EXIF format.

Figure 5:
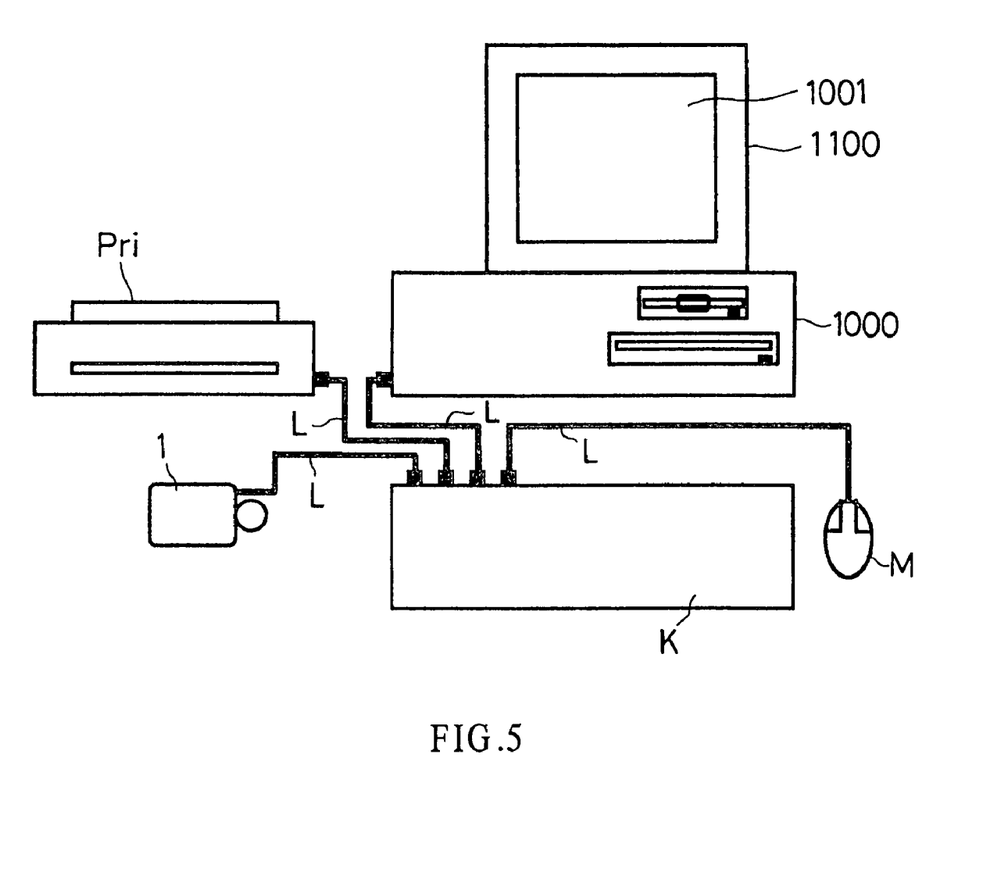
FIG. 5 illustrates the entire arrangement of the image display system according to an embodiment of the present invention.

FIG. 5 illustrates the entire arrangement of the image display system according to the preferred embodiment of the present invention.

The image display system includes a digital camera 1, and an image processing apparatus 1000, which is a desktop PC in this example. A keyboard K and a mouse M are connected to the PC 1000 via a USB cable L. A printer "Pri" is also connected to the PC via the USB cable L. The PC 1000 has a CRT or LCD display 1100, on which various images are displayed. The keyboard K also functions as a hub of the USB interface. A driver software (simply referred to as a driver) for a digital camera 1 is installed in the PC 1000 in advance, whereby various control operations are executed between the digital camera 1 and the PC 1000.

Figure 14:
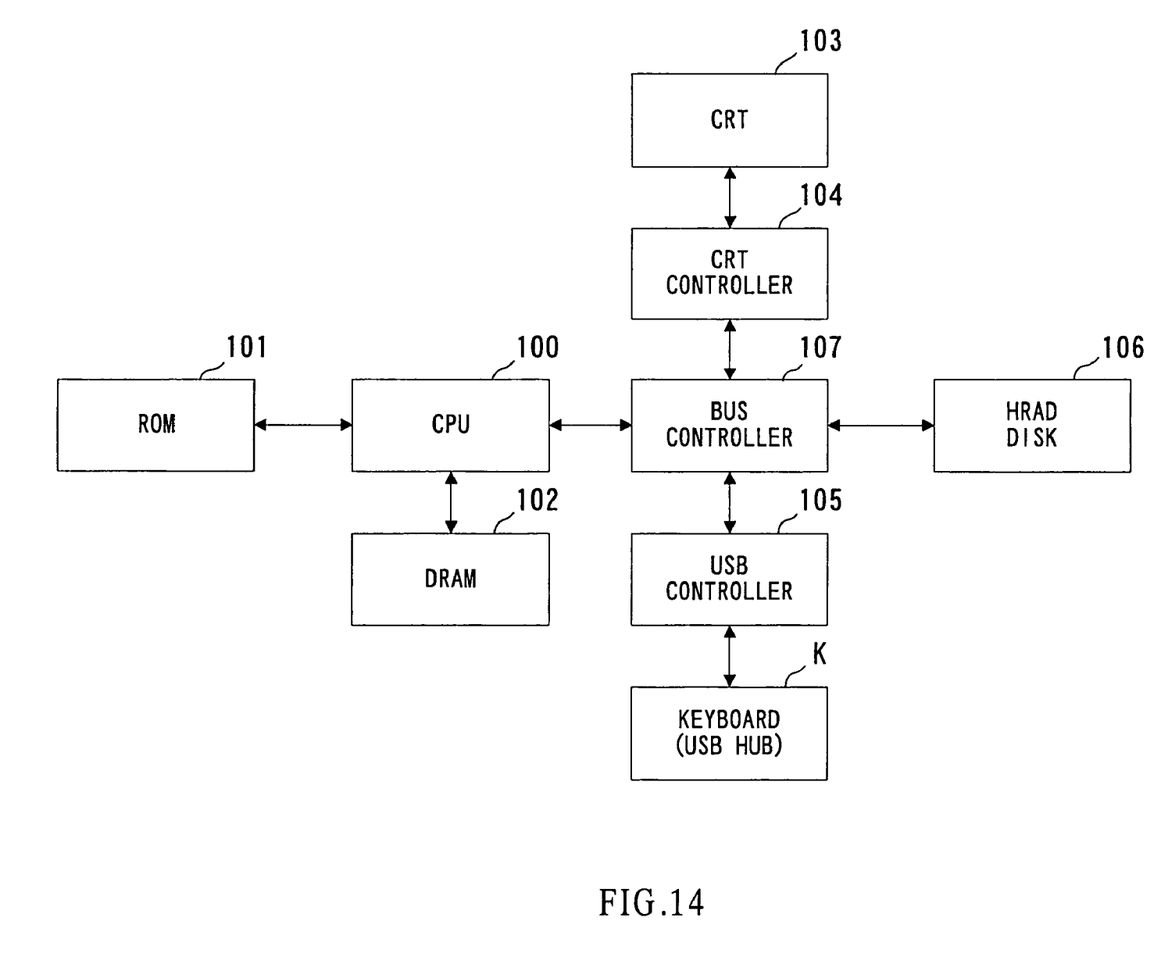
FIG. 14 is a block diagram of the internal structure of the PC.

FIG. 14 is a block diagram showing the internal structure of the PC 1000.

The CPU 100 controls the overall operations of the PC 1000. Control software for controlling the main body of the PC 1000 is installed in the ROM 101. DRAM 102 is used to process the image signal input from the digital camera 1. The CRT 103 corresponds to the monitor screen 1001 of the display of the PC 1000, and is controlled by the CRT controller 104. The USB controller 105 controls the USB connection between the keyboard K and the main body of the PC 1000. The hard disk 106 includes a recording medium and a driver for driving the recording medium. The recording medium stores in advance driver software for recognizing the connection state of the digital camera 1 and taking in the image data. The image data taken by the digital camera 1 is transferred to the PC 1000, and is recorded in the recording medium (i.e., the hard disk).

Image data is transferred among the CPU 100, the CRT controller 104, the USB controller 105, and the hard disk drive 106 via the bus controller 107.

Figure 6:
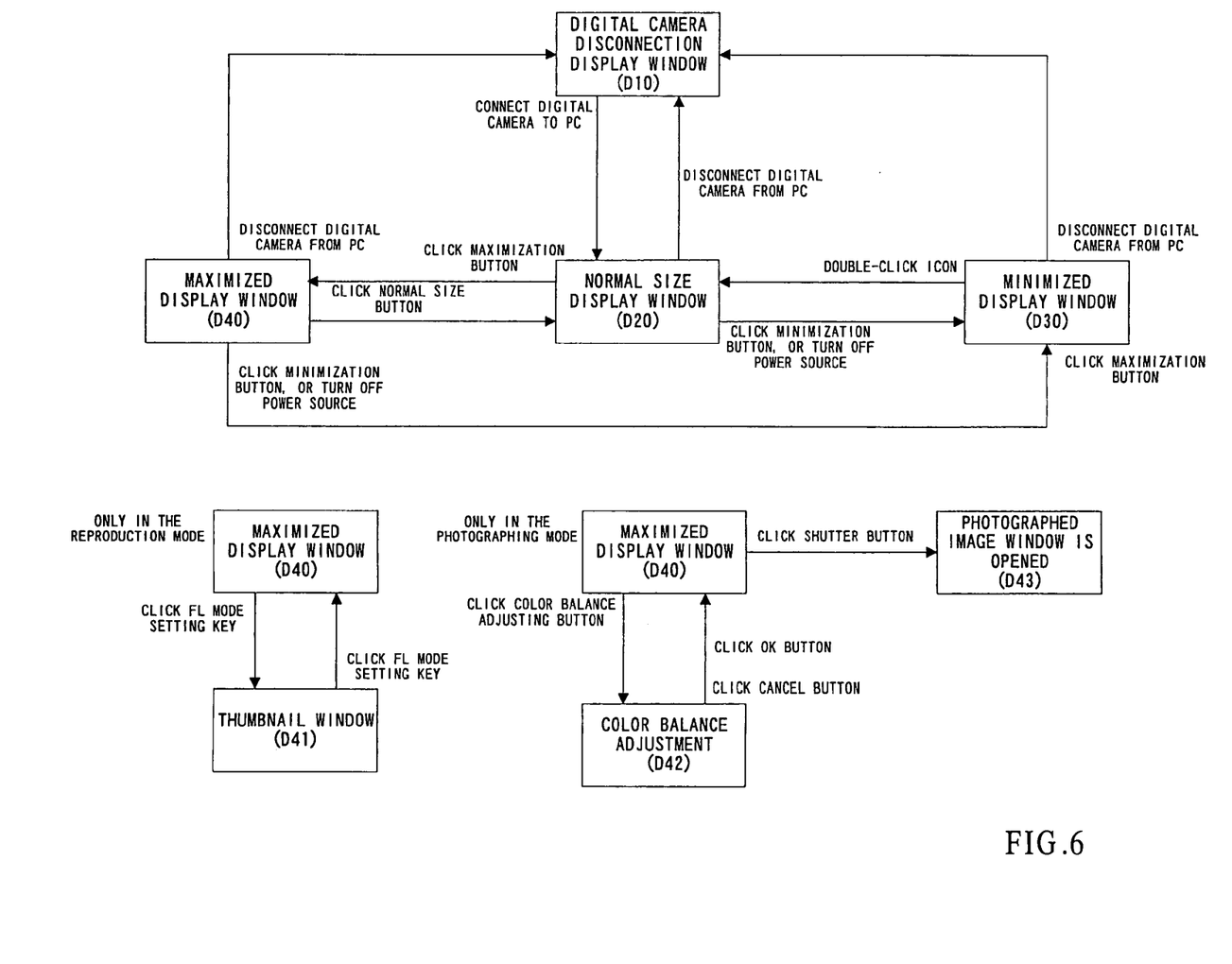
FIG. 6 illustrates transition of windows displayed on the monitor screen of the computer in the system shown in FIG. 5.

FIG. 6 illustrates transition of windows displayed on the display 1100 of the PC 1000 shown in FIG. 5.

Figure 7:
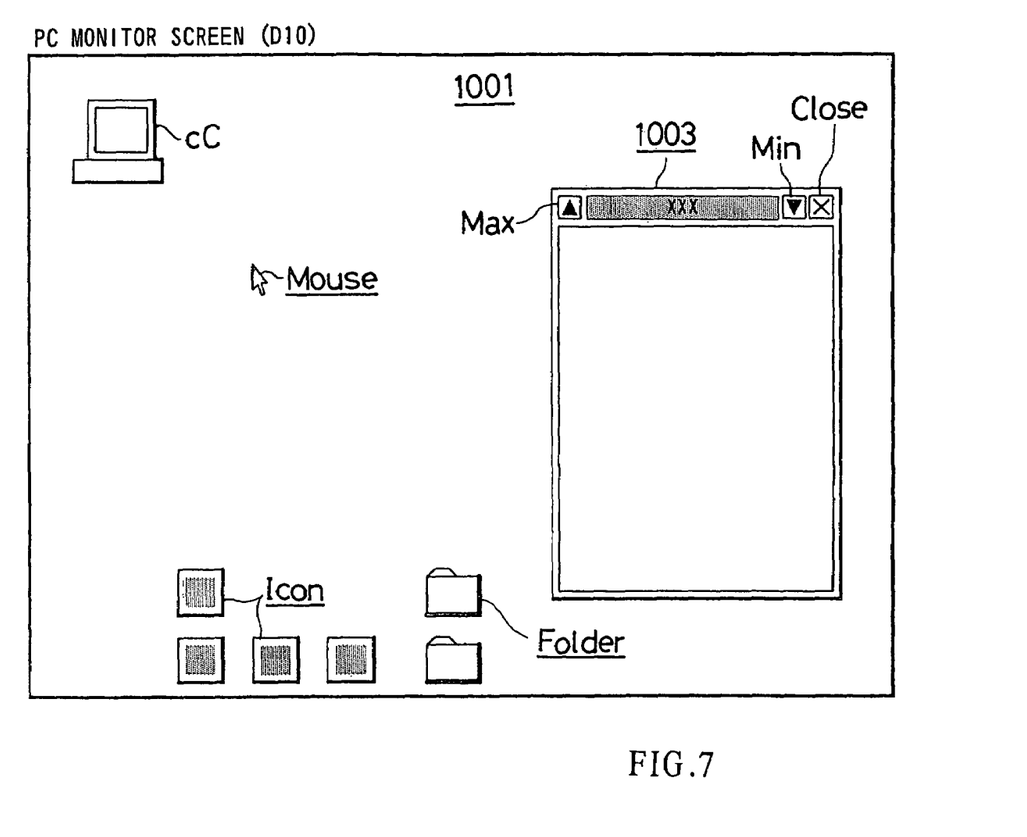
FIG. 7 illustrates an example of the digital camera-disconnection display windows (D10) shown in FIG. 6.

If the digital camera is not in connection with the PC 1000, the display panel 1001 of the PC 1000 shows the disconnection display window D10 shown in FIG. 7. In D10, various icons, i.e., data/application icons (Icon), folder icons (Folder), and a PC icon (cC), are displayed. In this example, a window 1003 is opened. The window 1003 has a minimization button (Min), a maximization button (Max), and a close button (Close). If the user moves the mouse cursor (Mouse) to a desired button, and clicks the left button of the mouse, the selected job is executed. The monitor screen 1001 of the display 1100 of the PC 1000 has a data size of 800×600 pixels.

Figure 8:
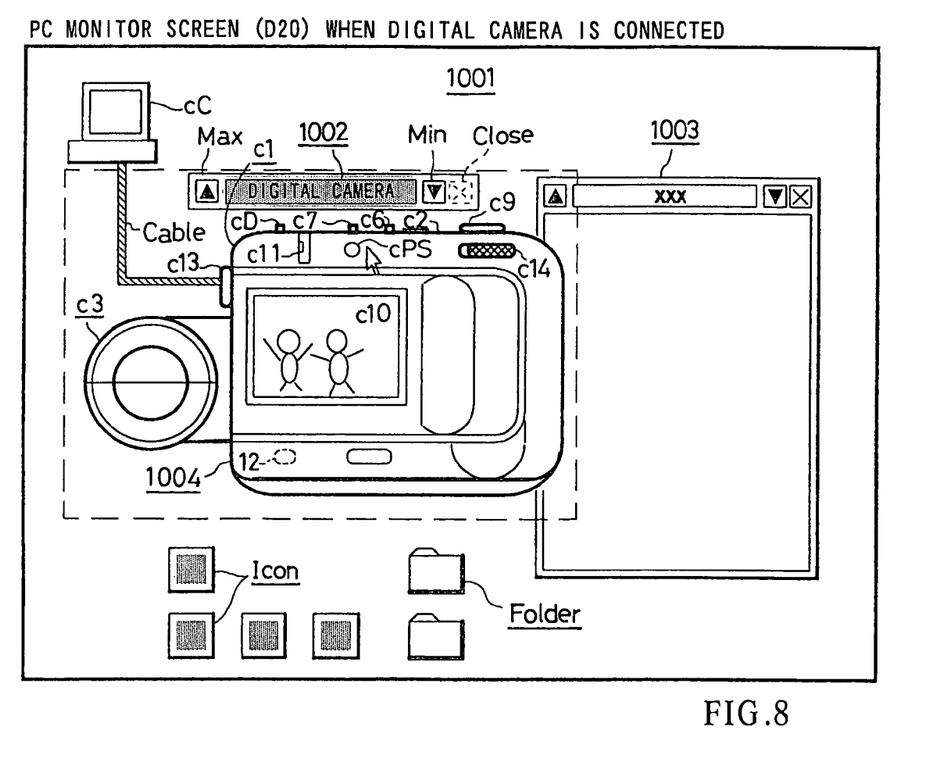
FIG. 8 illustrates the normal size display window (D20) shown in FIG. 6 when the digital camera is connected shown in FIG. 6.

If the digital camera 1 is connected to the USB port of the keyboard in the ON state of the PC 1000, the driver for the digital camera 1, which was installed in the PC 1000 in advance, is activated, and the monitor screen of the PC 1000 changes from the disconnection display window D10 shown in FIG. 7 to the normal size display window D20 shown in FIG. 8, in which a driver window 1004, together with a title bar 1002, are opened over the previously opened window 1003.

As shown in FIG. 8, the driver window 1004 shows the rear view of the digital camera 1 so that the user feels as if the actual camera exists before the user, which allows the user to manipulate the driver window very easily on the monitor screen 1001 of the PC 1000.

For example, a frame forwarding key (referred to as an UP key) c6 and a frame backwarding key (referred to as a DOWN key) c7 are provided to the camera displayed in the driver window 1004. If the UP key c6 is clicked, the frame number increases, while if the DOWN key c7 is clicked, the frame number decreases. A delete switch cD for deleting the image recorded in the memory card 8 is provided on the left side of the DOWN key c7. A shutter button c9 is provided on the right side of the UP key c6, and an FL mode setting key c11 is provided on the bottom left of the DOWN key c7. By clicking these keys or buttons displayed in the driver window 1004, the user can operate the digital camera 1 as if the real keys or buttons are actually operated by the user.

A virtual display panel c10 shows in real time the same image as that displayed in the actual display panel 10 of the digital camera 10, regardless of the current mode (the photographing mode or the reproduction mode) of the digital camera 1. This arrangement is achieved by transferring the data stored in the VRAM 210 of the digital camera 1 to the PC 1000 every time the image data displayed in the display panel 10 of the camera 1 is updated, as long as the digital camera 1 is in connection with the PC 1000. In the normal size display window D20, the data size of the virtual display panel c10 in the driver window 1004 is 240×180, which equals the data size of the actual display panel 10 of the digital camera 1. As has been described, since the VRAM 210 stores image data corresponding to 640×480 pixels, the image data size is reduced (or thinned out) to ⅜ when the image is displayed on the virtual display panel c10.

In FIG. 8 and the subsequent drawings, the small "c" before each numerical reference indicates the icon of the displayed element corresponding to the actual element.

Figure 9:
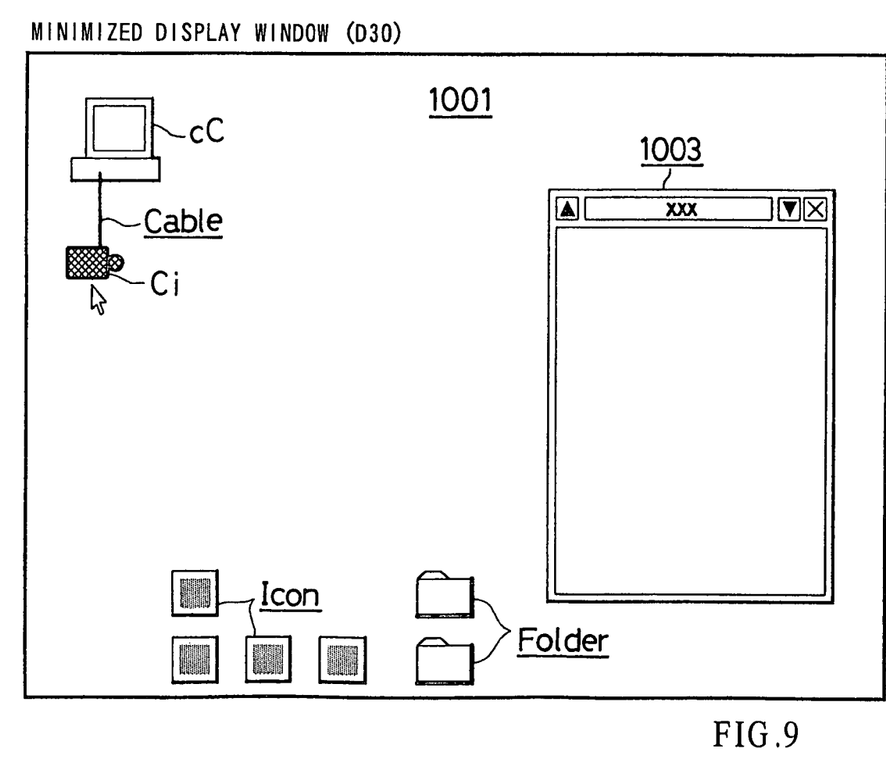
FIG. 9 illustrates the minimized display window (D30) shown in FIG. 6.

If, in normal size display window D20 shown in FIG. 8, the minimization button (Min) of the title bar 1002 is clicked, the driver window 1004 is minimized, and the monitor screen changes to the minimized display window D30, in which the image of the digital camera 1 is displayed as an icon (ci), as shown in FIG. 9. Since the digital camera 1 is still in connection with the PC 1000, the cable is displayed between the PC icon (cC) and the camera icon (ci) on the monitor screen 1001 of the PC 1000.

The driver window 1004 is also minimized from the normal size display window D20 when the power source of the digital camera 1 is turned off. The power source of the digital camera 1 can be turned off by clicking the power source switch cPS of the virtual camera c1, or by operating the power source switch PS of the actual digital camera 1.

If, in the minimized display window D30 shown in FIG. 9, the icon Ci is double-clicked by the mouse, the window D30 returns to the normal size display window D20. In the minimized display window D30 when the power source of the digital camera 1 is turned off, the icon Ci is double-clicked, the power-on signal is transmitted from the PC 1000 to the digital camera 1, and the monitor screen returns to the normal size display window D20.

Figure 10:
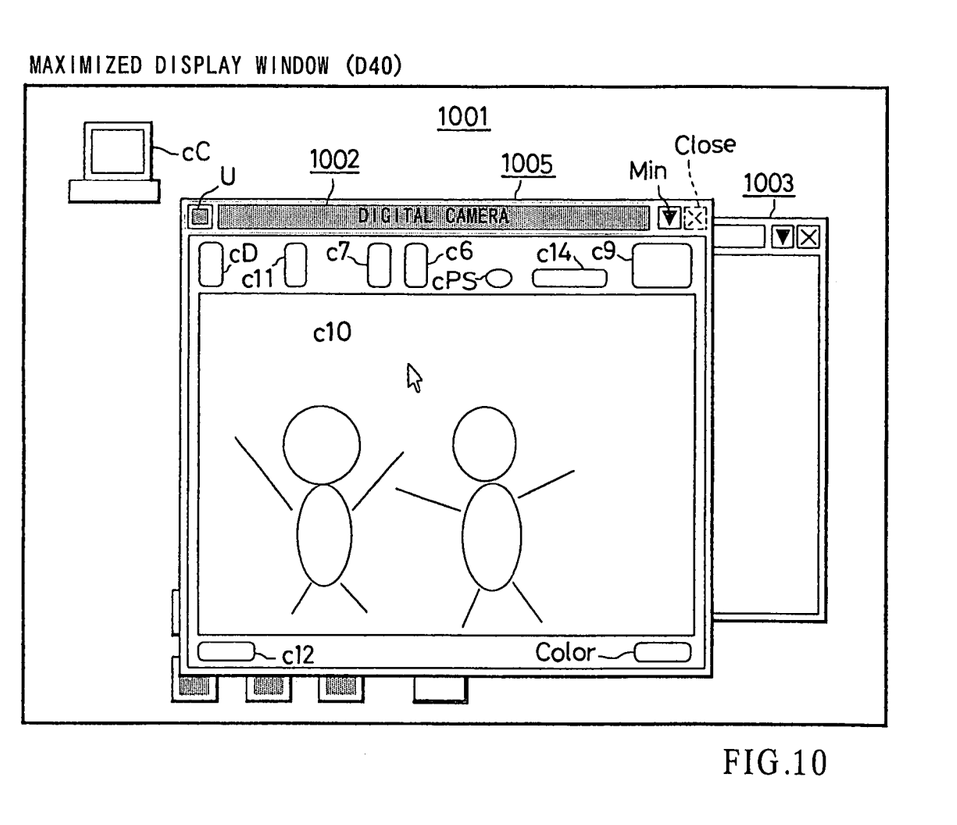
FIG. 10 illustrates the maximized display window (D40) shown in FIG. 6.

If, in the normal size display window D20 shown in FIG. 8, the maximization button (Max) is clicked, the monitor screen changes to the maximized window D40 shown in FIG. 10. In D40, the window 1005 is opened, and the image is displayed in the virtual display panel c10 with the data size of 640×480 pixels, which equals the pixel size of the digital camera 1. Thus, the image to be photographed is displayed on the monitor screen of the PC 1000 in real time at the actual resolution of the digital camera 1. In this case, the image data stored in the VRAM 210 is displayed without thinning out the image data. The switches and the buttons of the digital camera displayed in the normal size display window D20 is then displayed in the maximized window D40 under the title bar 1002 with the positional relationship maintained. Accordingly, the user can manipulate the operation switches of the digital camera 1 via the monitor screen of the PC 1000.

If the digital camera 1 is disconnected from the PC 1000, the monitor screen returns to the digital camera disconnection display window D10 shown in FIG. 7 from the normal size display window D20 shown in FIG. 8, the minimized display window D30 shown in FIG. 9, and the maximized display window D40 shown in FIG. 10. The user can confirm the connection state of the digital camera 1 on the monitor screen of the PC 1000 at a glance.

Figure 11:
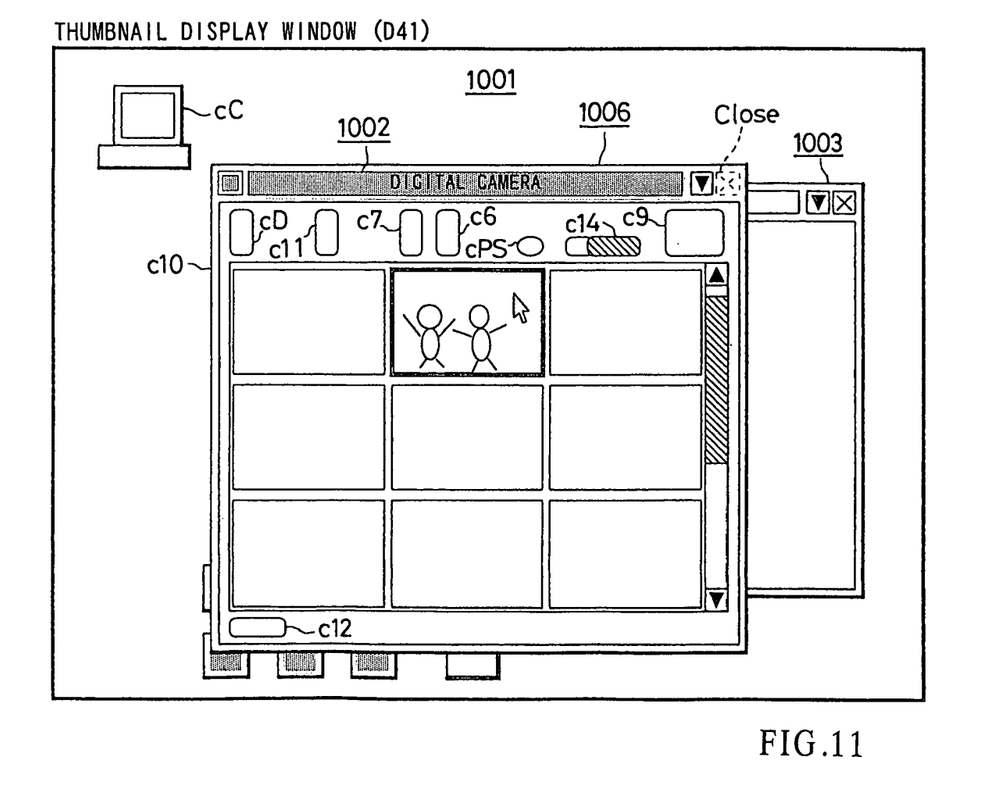
FIG. 11 illustrates the thumbnail display window (D41) shown in FIG. 6.

If, in the maximized display window D40 shown in FIG. 10, the FL mode setting key c11 is manipulated on the monitor screen in the reproduction mode (i.e., with the mode setting switch c14 set to the reproduction state), the monitor screen changes to the thumbnail display window D41 shown in FIG. 11, in which the photographed images are displayed in the thumbnail size. In this state, the thumbnail window 1006 is opened, and each thumbnail image (or a frame) is displayed in the window 1006 at a data size of 200×150 pixels. On the display panel of the actual digital camera 1, the thumbnail image is displayed at a data size of 80×60 pixels which coincides with the data size. Accordingly, when the thumbnail image is displayed on the PC 1000, the image data is interpolated, and an enlarged image is displayed. The user can easily recognize and distinguish the thumbnail images on the PC 1000. If the FL mode setting key c11 is clicked in the thumbnail window 1006, the monitor screen returns to the maximized display window D40 shown in FIG. 10.

In the maximized display window D40, a colour balance adjusting button (Colour) is displayed at the bottom right of the driver window 1005. If the colour balance adjusting button is clicked in the photographing mode (i.e., with the mode change switch c14 set to the photographing state), the monitor screen of the PC 1000 changes to the colour balance adjusting display window D42 shown in FIG. 12, in which a modal dialogue 1007 is displayed. If the adjusting bars 10071, 10072 and 10073, which correspond to red, green and blue, respectively, are dragged using the mouse, colour balance adjusting signals are transmitted from the PC 1000 to the WB adjusting circuit of the digital camera 1, whereby the colour balance, including the white balance, is adjusted in real time from the PC side. When the colour balance adjusting display window 1007 is opened, the adjusting levers LR LG and LB are located in the middle of the bars 10071, 10072 and 10072 as default positions. If the lever is dragged to the right, the colour density increases (i.e., becomes dark), and the lever is dagged to the left, the colour density decreases (i.e., becomes pale).

Figure 12:
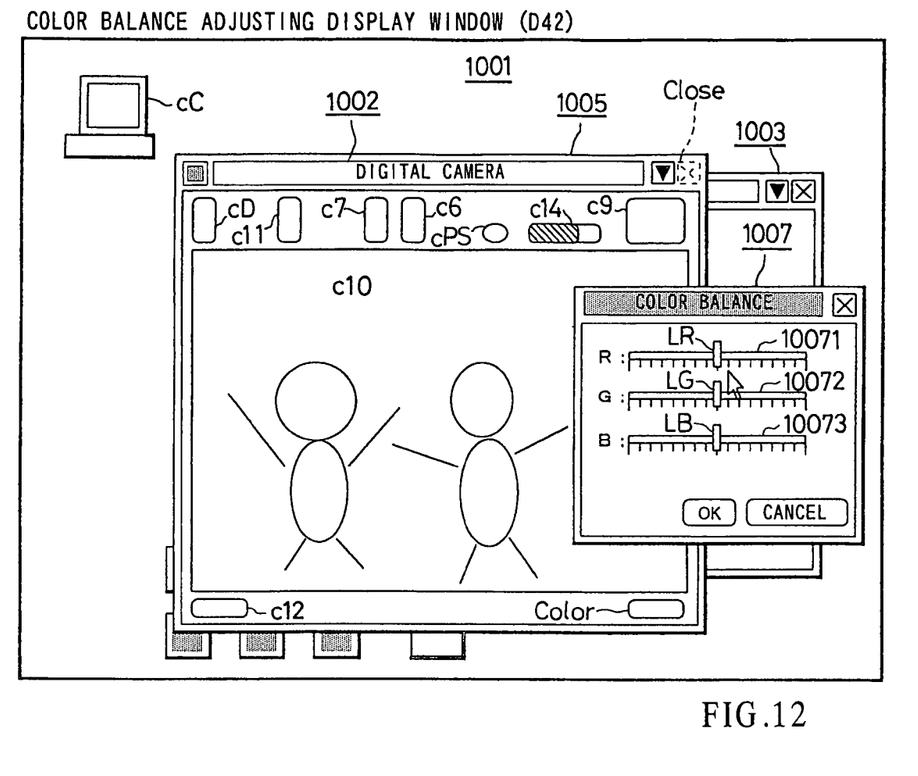
FIG. 12 illustrates the colour balance adjusting display window (D42) shown in FIG. 6.

In the conventional technique, the user had to look into the small display panel 10 of the digital camera 1 to check the colour balance adjusting result, and it is not easy to check in details in the small display panel. For this reason, the colour balance adjusting level that the user intended is sometimes inconsistent with the actually photographed image. In contrast, with the present embodiment of the invention, the user can confirm the colour balance adjusting result on the PC 1000 at the same size as the actual photographing size.

If, in the colour balance adjusting display window D42 shown in FIG. 12, the OK button is clicked in the colour balance adjusting dialogue 1007, the adjusting result is validated, and the monitor screen returns to the maximized display window D40 shown in FIG. 10. If, instead, the CANCEL button is clicked in the colour balance adjusting dialogue 1007, the adjusting result is invalidated, and the monitor screen also returns to the maximized display window D40. Thus, the object is photographed based on the final adjusting result.

In the maximized display window D40 (in FIG. 10), a normal size button U for returning to the normal size is provided instead of the maximization button (Max). If the normal size button U is clicked, the monitor screen returns to the normal size display window D20 shown in FIG. 8. If the minimization button (Min) is clicked, or the power source of the digital camera 1 is turned off, then the monitor screen changes to the minimized display window D30 shown in FIG. 9.

The close button is invalidated in the windows D20, D30, D40 and D41, and therefore, nothing happens even if the close button is clicked in these windows. In other words, the driver is always in the activated state as long as the digital camera 1 is in connection with the PC 1000. Accordingly, the user can know the connection state of the digital camera 1 by simply looking at the monitor screen of the PC 1000.

Figure 13:
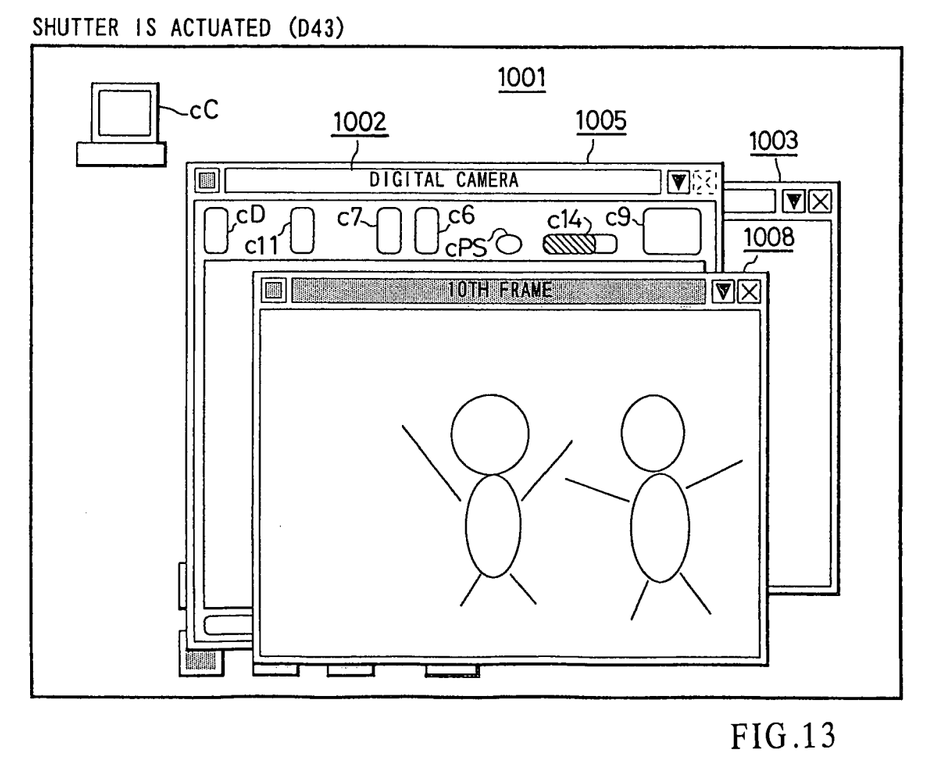
FIG. 13 illustrates the view finder window (D43) shown in FIG. 6 when the shutter button has been actuated.

In a state that the camera mode is set to the photographing mode in the maximized display window D40 shown in FIG. 10, a photographing action is taken every time the shutter button 9 is actually pressed or the shutter button c9 is clicked in the monitor screen of the PC 1000. Every time the object is photographed, a photographed image window 1008 is opened in the window D43, as shown in FIG. 13. The corresponding frame number is displayed on the title bar of the window 1008. Accordingly, the user can immediately confirm the photographed image on the monitor screen of the PC 1000.

In this manner, with the image display system according to the embodiment of the present invention, image data is transferred from the digital camera to the computer, and is displayed on the monitor display of the computer (PC) in accordance with the number of pixels of the photographed image. The user can confirm the image which is to be taken or has already been taken on the monitor screen of the computer at the actual photographing size. If the photographed image is manipulated from the computer side, the user can immediately know the resultant image. Thus, real-time cooperation between the digital camera and the computer is improved, and a convenient and user-friendly digital camera system is achieved.

By manipulating the image correction means displayed on the monitor screen of the computer, the user can adjust and set the correction parameters of the photographed image to desirable values, while monitoring the post-correction image, until a desired image is obtained.

Through colour adjustment of red, green and blue, as well as white balance adjustment, a clear and high-quality image is obtained.

By interpolating the thumbnail data of the digital camera and displaying the enlarged image on the display of the computer, the user can easily distinguish the image of each frame, and the convenience is further improved.

Every time a shutter operation has been taken by pressing the shutter button or manipulating the picture of the shutter button displayed on the computer, a new window is opened, in which the photographed image is displayed. The user can see and check the photographed image immediately after the shutter operation.

The window representing the digital camera may be automatically minimized upon turning off the power source switch. In this case, unnecessary display of the digital camera window is reduced, and the monitor screen of the computer can be used efficiently.

The digital camera window may be automatically closed upon disconnection of the digital camera from the computer. In this case, unnecessary display of the digital camera window is reduced, and the monitor screen of the computer can be used efficiently.

Although the present invention has been described based on the preferred embodiment, the terms and the sentences used in this specification are explanatory, and not limiting the present invention. It should be appreciated that there are many modifications and substitutions without departing from the spirit and scope of the present invention.

What is claimed is:

1. An image processing apparatus connectable to a photographing apparatus, comprising:
   an interface for connecting said image processing apparatus to said photographing apparatus;
   a display which can display a plurality of windows and function indicators based on data processed by said image processing apparatus, wherein one of said windows shows said photographing apparatus and an indicator for transmitting a power-off instruction to said photographing apparatus in order to turn off the power source of said photographing apparatus; and a controller for minimizing the window showing said photographing apparatus when the power-off instruction has been transmitted from said indicator for turning off the power of said photographing apparatus.

2. The image processing apparatus according to claim 1, wherein said window displayed on said display is closed when said photographing apparatus is disconnected from said image processing apparatus.

3. The image processing apparatus of claim 1, wherein said one window displays multiple components of said photographing apparatus, and the minimized window comprises an iconic representation of said photographing apparatus.

* * * * *